US012084976B2

(12) United States Patent
Murray et al.

(10) Patent No.: US 12,084,976 B2
(45) Date of Patent: Sep. 10, 2024

(54) DYNAMIC SEALING ASSEMBLY

(71) Applicant: Rolls-Royce plc, London (GB)

(72) Inventors: Christopher A. Murray, Nottingham (GB); Nicholas Howarth, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/463,633

(22) Filed: Sep. 8, 2023

(65) Prior Publication Data

US 2024/0102399 A1 Mar. 28, 2024

(30) Foreign Application Priority Data

Sep. 26, 2022 (GB) ..................................... 2213999

(51) Int. Cl.
*F01D 11/00* (2006.01)
*F01D 15/08* (2006.01)
*F01D 17/14* (2006.01)

(52) U.S. Cl.
CPC ............ *F01D 11/001* (2013.01); *F01D 15/08* (2013.01); *F01D 17/143* (2013.01); *F05D* *2240/56* (2013.01)

(58) Field of Classification Search
CPC ..................................................... F01D 17/143
See application file for complete search history.

(56) References Cited

U.S. PATENT DOCUMENTS

| | | | |
|---|---|---|---|
| 4,844,690 A | 7/1989 | De Laurier et al. | |
| 2011/0123316 A1* | 5/2011 | Roberts .................. | F02B 37/22 415/160 |
| 2013/0043658 A1 | 2/2013 | Zheng et al. | |
| 2017/0101880 A1 | 4/2017 | Thomas et al. | |
| 2017/0284401 A1 | 10/2017 | Kreienkamp et al. | |
| 2020/0109720 A1* | 4/2020 | Turner .................... | F04D 17/10 |

FOREIGN PATENT DOCUMENTS

| | | |
|---|---|---|
| EP | 3517436 B1 | 5/2020 |
| EP | 3517437 B1 | 5/2020 |
| EP | 3517438 B1 | 6/2020 |
| GB | 1029647 A | 5/1966 |
| JP | 2001329995 A | 11/2001 |

OTHER PUBLICATIONS

Great Britain search report dated Mar. 3, 2023, issued in GB Patent Application No. 2213999.2.
European search report dated Feb. 5, 2024, issued in EP Patent Application No. 23196470.1.

* cited by examiner

*Primary Examiner* — Brian O Peters

(57) ABSTRACT

There is provided a dynamic sealing assembly for a rotary machine, comprising a primary sandwich plate, a secondary sandwich plate and a bristle pack. The primary sandwich plate comprises a plurality of primary vane openings, and the secondary sandwich plate comprises a plurality of secondary vane openings. The bristle pack comprises a plurality of bristles and is disposed between the primary sandwich plate and the secondary sandwich plate. Each of the plurality of primary vane openings overlies and aligns with a respective secondary vane opening to form a vane channel for receiving a vane along a longitudinal axis of the dynamic sealing assembly. The bristle pack is configured to: provide a brush seal between each vane received within the respective vane channels and the dynamic sealing assembly; and allow relative movement between the dynamic sealing assembly and the vane received within each vane channel along the longitudinal axis.

20 Claims, 9 Drawing Sheets

DYNAMIC SEALING ASSEMBLY

CROSS-REFERENCE TO RELATED APPLICATIONS

This specification is based upon and claims the benefit of priority from United Kingdom Patent Application No. 2213999.2, filed on 26 Sep. 2022, the entire contents of which are incorporated herein by reference.

BACKGROUND

Technical Field

The present disclosure relates to a dynamic sealing assembly for a rotary machine. The present disclosure relates further to a method of manufacturing a dynamic sealing assembly for a rotary machine. The present disclosure also relates to a blower assembly comprising a dynamic sealing assembly.

Description of the Related Art

Rotary machines (such as turbomachines) may comprise moving components. For better performance, it is desirable to provide means for sealing moving components within a rotary machine.

Blower assemblies which make use of air which is bled from a lower pressure source of a gas turbine engine (such as a bypass duct) and which subsequently compress the air prior to delivering it to the airframe of aircraft are also known, as described in EP3517436 B1, EP3517437 B1 and EP3517438 B1. It may be especially desirable to provide means for sealing moving components within a blower assembly for an aircraft. Such means for sealing moving components may be referred to as dynamic sealing means.

SUMMARY

According to a first aspect, there is provided a dynamic sealing assembly for a rotary machine, comprising: a primary sandwich plate comprising a plurality of primary vane openings; a secondary sandwich plate comprising a plurality of secondary vane openings; and a bristle pack comprising a plurality of bristles disposed between the primary sandwich plate and the secondary sandwich plate; wherein each of the plurality of primary vane openings overlies and aligns with a respective secondary vane opening to form a vane channel for receiving a vane along a longitudinal axis of the dynamic sealing assembly; and wherein the bristle pack is configured to: provide a brush seal between each vane received within the respective vane channels and the dynamic sealing assembly; and allow relative movement between the dynamic sealing assembly and the vane received within each vane channel along the longitudinal axis.

The longitudinal axis may be an axis extending through a geometrical centre of the dynamic sealing assembly. The dynamic sealing assembly may be annular around the longitudinal axis. The dynamic sealing assembly may be configured to translate (e.g., slide) along the longitudinal axis to effect relative movement between the dynamic sealing assembly and the respective vanes. The longitudinal axis may be coincident with a rotational axis of the rotary machine. It may be that the dynamic sealing assembly is coaxial with a rotary component of the rotary machine (e.g., a rotor).

It may be that, in each of the vane channels, a window is defined within the bristle pack to receive the respective vane therethrough. It may be that each window is formed within the bristle pack using water-jet cutting, laser cutting, or spark eroding. Each window is defined within the bristle pack such that the bristle pack protrudes into the respective vane channel to define the window. It may be that a profile of each of the windows corresponds to a cross-sectional profile of the vane to be received therein.

The bristle pack is clamped between the primary sandwich plate and the secondary sandwich plate. It may be that the bristle pack is clamped by cooperation of a primary opening boss disposed around each of the primary vane openings and an opposing secondary vane opening boss disposed around the respective secondary vane opening. It may be that each of the plurality of bristles of the bristle pack is bonded to the primary sandwich plate and/or to the secondary sandwich plate at a plurality of bonding locations, each bonding location being between a respective primary opening boss and an opposing secondary vane opening boss. Each of the plurality of bristles of the bristle pack may be bonded to the primary sandwich plate and/or to the secondary sandwich plate by brazing, laser welding or diffusion bonding.

Further, it may be that each vane channel has: an inner region located relatively proximal to a geometrical centre of the dynamic sealing assembly; and an outer region located relatively distal to the geometrical centre of the dynamic sealing assembly. The dynamic sealing arrangement may be configured such that: the bristles of the bristle pack provide greater resistance to deflection in a first direction parallel to the longitudinal axis within the inner region than within the outer region; and the bristles of the bristle pack provide greater resistance to deflection in a second direction parallel to the longitudinal axis within the outer region than within the inner region, the first direction opposing the second direction.

It may be that, in each inner region, an inner guide is disposed between the primary opening boss and the window, the inner guide protruding from the primary sandwich plate to support the bristles of the bristle pack. Additionally or alternatively, it may be that in each outer region, an outer guide is disposed between the secondary opening boss and the window, the outer guide protruding from the secondary sandwich plate to support the bristles of the bristle pack.

It may be that the primary sandwich plate comprises a plurality of throat openings, with each throat opening being in fluid communication with each other throat opening via a connecting fluid pathway. Each throat opening may be located proximal to a respective vane channel. A hole may be formed in the bristle pack at a location underlying each throat opening. It may be that each hole is formed within the bristle pack using water-jet cutting, laser cutting, or spark eroding. In addition, it may be that each hole is formed in the bristle pack such that an edge of the respective hole is substantially flush with an edge of the respective throat opening.

Further, it may be that each sandwich plate is annular around the longitudinal axis; and each of the plurality of bristles of the bristle pack extends substantially parallel a local radial direction extending from the longitudinal axis.

Each of the plurality of bristles of the bristle pack may have a melting point which is greater than 300° C. It may be that each of the plurality of bristles of the bristle pack are formed of carbon fibre or a high-nickel alloy.

According to a second aspect, there is provided a blower assembly for providing air to an airframe system, the blower assembly comprising: the dynamic sealing assembly of the first aspect; and a rotor configured to be mechanically coupled to a spool of a gas turbine engine; wherein the blower assembly is operable in a compressor configuration in which the rotor is configured to be driven to rotate by the spool and to receive and compress air from the gas turbine engine, and discharge the compressed air for supply to the airframe system; and wherein the blower assembly further comprises: a diffuser vane array comprising a plurality of diffuser vanes and configured to act together with the rotor to compress air received at the rotor in the compressor configuration, wherein the dynamic sealing assembly is positioned within the blower assembly such that each diffuser vane is partially located within a respective vane channel; and an actuator arrangement configured to cause relative movement between the dynamic sealing assembly and the diffuser vane array to adjust an effective axial height of the diffuser vanes in the compressor configuration, wherein the effective axial height is with respect to a rotational axis of the rotor.

According to a third aspect, there is provided a blower assembly for providing air to an airframe system, the blower assembly comprising: the dynamic sealing assembly of the first aspect; and a rotor configured to be mechanically coupled to a spool of a gas turbine engine; wherein the blower assembly is operable in a turbine configuration in which the rotor is configured to receive air from an external air source to drive the spool to rotate; and wherein the blower assembly further comprises: a nozzle guide vane array comprising a plurality of nozzle guide vanes and configured to act together with the rotor to expand air received at the nozzle guide vane array in the turbine configuration, wherein the dynamic sealing assembly is positioned within the blower assembly such that each nozzle guide vanes is partially located within a respective vane channel; and an actuator arrangement configured to cause relative movement between the dynamic sealing assembly and the nozzle guide vane array to adjust an effective axial height of the nozzle guide vanes in the turbine configuration, wherein the effective axial height is with respect to a rotational axis of the rotor.

According to a fourth aspect there is provided a gas turbine engine for an aircraft, the gas turbine engine comprising a blower assembly in accordance with the second aspect or the third aspect. According to a fifth aspect there is provided an aircraft comprising a blower assembly in accordance with the second aspect or the third aspect, or comprising a gas turbine engine in accordance with the fourth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts (or spools) that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a cabin blower assembly or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Examples will now be described with reference to the accompanying drawings, which are purely schematic and not to scale, and in which.

DETAILED DESCRIPTION

Figure 1:
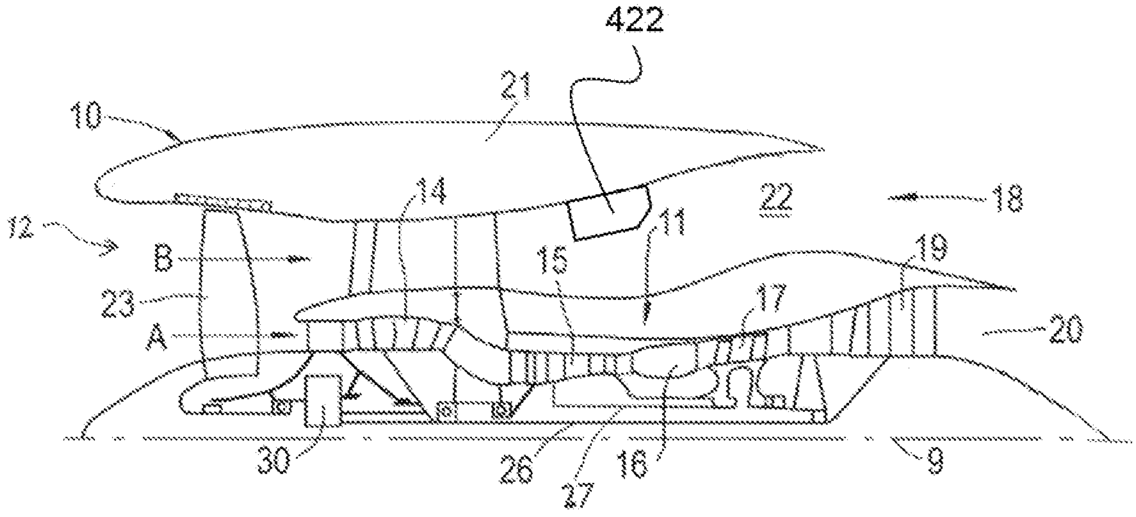
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure turbine 17 and low pressure turbine 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
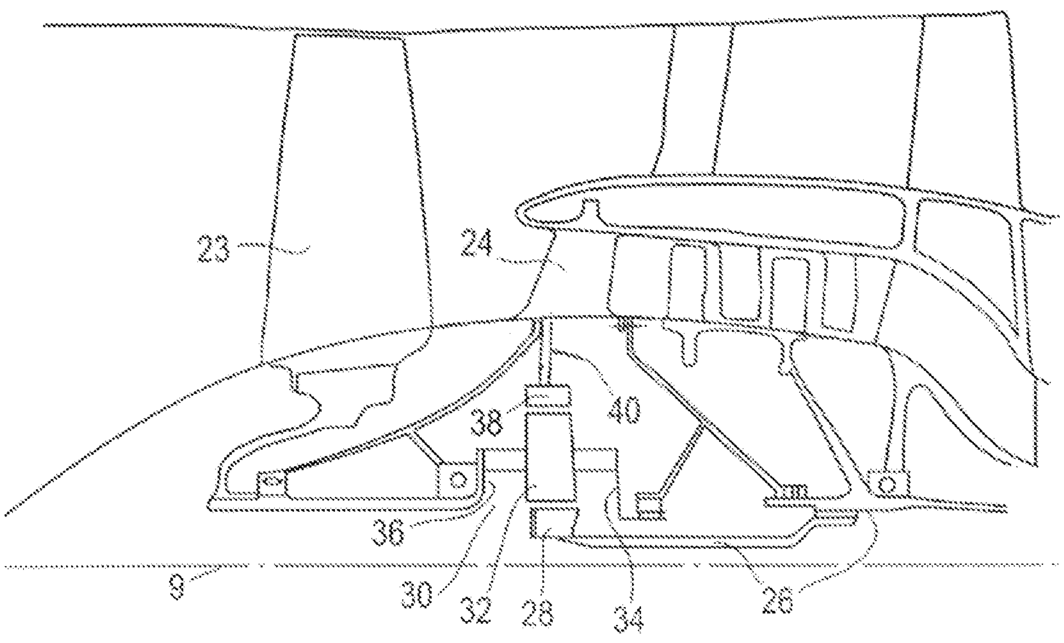
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26 (or spool), which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 (or spool) with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
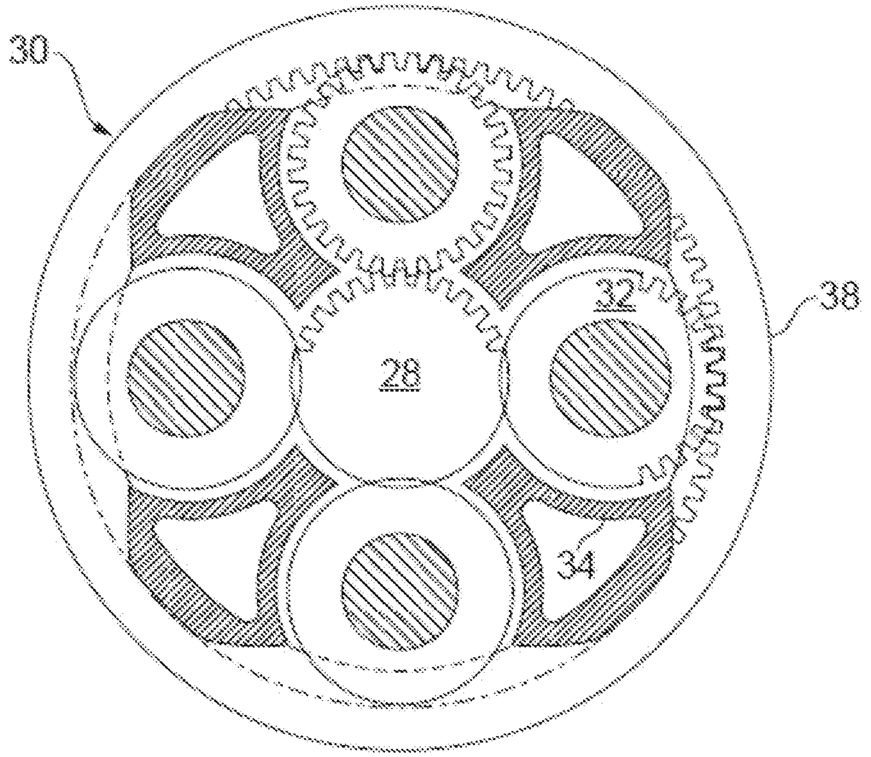
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
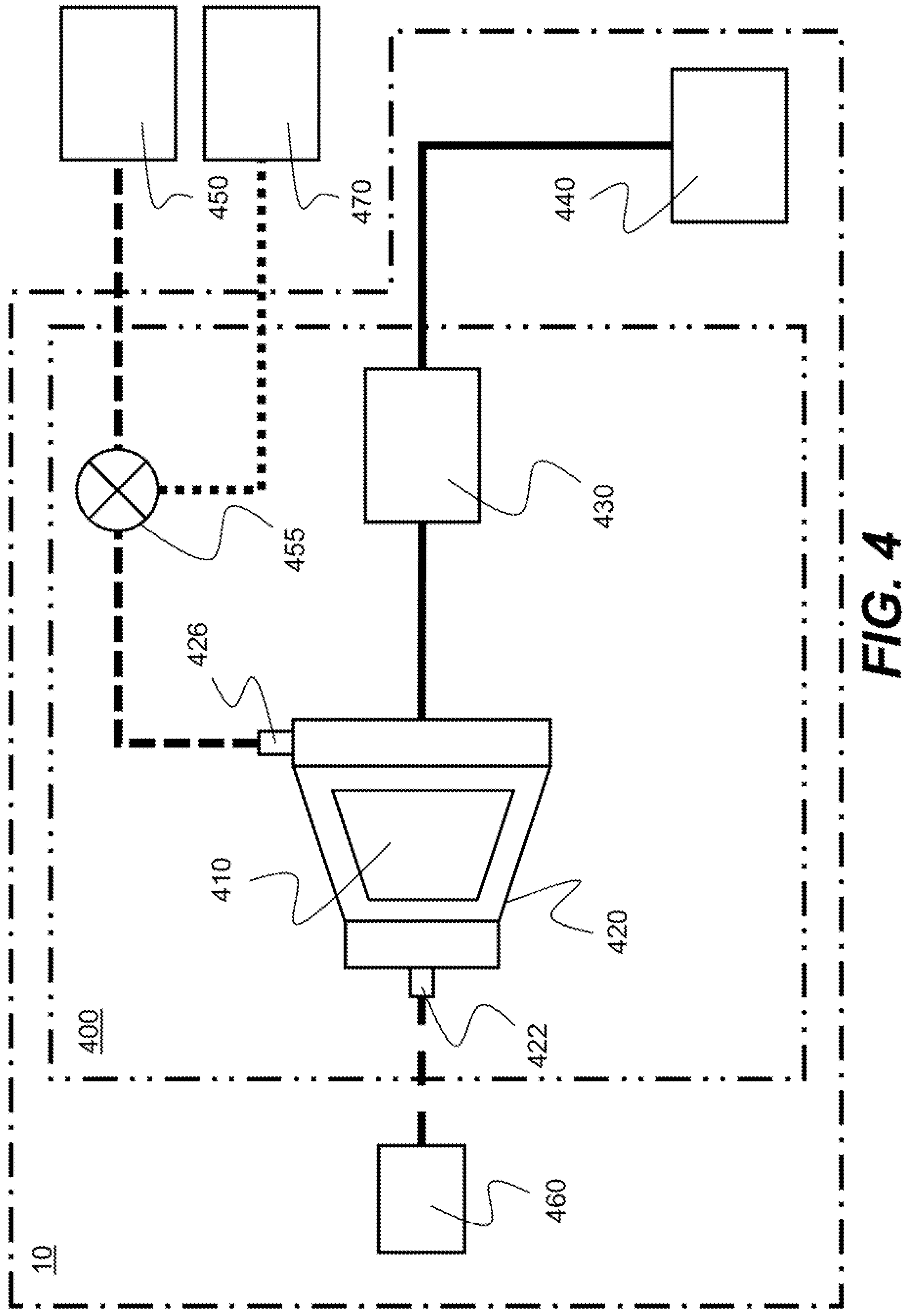
FIG. 4 is a diagram which schematically shows an example blower assembly for providing air to an airframe system.

A diagram of an example blower assembly 400 for providing air to an airframe system is shown schematically in FIG. 4. The blower assembly 400 is a rotary machine (in particular a turbomachine) comprising a rotor 410 which is configured to be mechanically coupled to a spool 440 of a gas turbine engine. The spool may, for example, be the high-pressure (HP) spool of a two- or three-shaft gas turbine or an intermediate pressure (IP) spool of a three-spool engine, though any one or more spools of a gas turbine engine may be coupled to the rotor. The rotor 410 is disposed within a rotor housing 420. In the example of FIG. 4, the blower assembly 400 comprises a variable transmission 430 for mechanically coupling the rotor 410 to the spool 440. The blower assembly 400 is moveable between a compressor configuration and a turbine configuration by relative movement between the rotor 410 and a flow modifier.

The rotor 410 is configured to be driven to rotate by the spool 440 in the compressor configuration, whereby the blower assembly 410 compresses air it receives from the gas turbine engine. The compressed air is discharged to an airframe discharge nozzle 426 for supply to an airframe system 450 for an airframe pressurisation purpose. The airframe pressurisation purpose may be, for example, wing anti-icing, fuel tank inerting, cargo bay smoke eradication and/or aircraft cabin pressurisation. In the example of FIG. 4, the rotor is configured to receive air from the gas turbine engine via an engine bleed nozzle 422 (as also shown on FIG. 1). The engine bleed nozzle 422 is in fluid communication with an air pathway (shown schematically at 460) of the gas turbine engine. Accordingly, in the compressor configuration, the blower assembly 400 is configured to draw air from the air pathway 460 of the gas turbine engine and supply air to the airframe system 450, for example to pressurise and/or ventilate an aircraft cabin.

The blower assembly 400 is configured to function as a compressor in the compressor configuration, such that air supplied to the airframe system 450 is at a higher pressure than air drawn from the air pathway 460 of the gas turbine engine. As a result, the blower assembly 400 is not required to draw air from a relatively high-pressure region of the gas turbine engine in order to supply pressurised air to the airframe system 450. Instead, the blower assembly 400 may draw air via the engine bleed nozzle 422 from a relatively low-pressure region of the gas turbine engine, such as from a bypass duct 22 of the gas turbine engine as shown in FIG. 1. If the blower assembly 400 were alternatively required to draw air from a relatively high-pressure region of the gas turbine engine (e.g., the high pressure compressor), an efficiency of the gas turbine engine may be reduced. Therefore, the blower assembly 400 provides a more efficient airframe system pressurisation and ventilation system when incorporated into an aircraft. In addition, this approach reduces a scope for contamination of the air supply to the airframe system 450.

The rotor 410 is driven to rotate in the compressor configuration by the variable transmission 430, which itself receives drive input from the spool 440, for example through an accessory gearbox of the gas turbine engine. The speed of rotation of the spool 440 depends on the operating point of the gas turbine engine, which dictates a speed of the spool 440. The variable transmission 430 allows a rotational speed of the rotor 410 in the compressor configuration to be decoupled from a rotational speed of the spool 440, so that a compression performance of the blower assembly 400 in the compressor configuration is not solely governed by the operating point of the gas turbine engine (e.g., it can be controlled to operate at a target speed independent of the rotational speed of the spool, and/or at a variable speed ratio relative to the rotational speed of the spool). Inclusion of a variable transmission 430 within the blower assembly 400 therefore provides more versatile and adaptable means for supplying pressurised air to an airframe system. Various suitable variable transmission types will be apparent to those of ordinary skill in the art. For example, the variable transmission 430 may comprise an electric variator, as described in EP 3517436 B1.

The blower assembly 400 is also configured to be able to receive (e.g., configured to selectively receive) compressed air from an external air source 470 to drive the spool 440 to rotate, for example for starting the gas turbine engine in the turbine configuration. In the example of FIG. 4, the blower assembly is configured to receive compressed air from the external air source 470 via the airframe discharge nozzle 426. In addition, the blower assembly 400 further comprises a start control and isolation valve 455 which is configured to isolate the airframe discharge nozzle 426 from the external air source 470 in the compressor configuration, and to isolate the airframe discharge nozzle 426 from the airframe system 450 in the turbine configuration. The start control and isolation valve 455 may be further configured to control a mass flow and a pressure of an air flow from the external air source 470 to the airframe discharge nozzle 426 in the turbine configuration. However, it will be appreciated that the blower assembly 400 may otherwise be configured to receive compressed air from the external air source 470, such as via an external air nozzle, for example.

The external air source 470 may be derived from, for example, an auxiliary power unit (APU) of the aircraft or ground starting equipment (GSE). In the example of FIG. 4, the blower assembly 400 is configured to discharge air to the engine bleed nozzle 422 in the turbine configuration. However, the blower assembly 400 may otherwise discharge air in the turbine configuration, such as to a dedicated auxiliary nozzle, for example. Air discharged from the blower assembly 400 via a dedicated auxiliary nozzle may be used for cooling other systems and/or components of the gas turbine engine and/or the aircraft in the turbine configuration.

The blower assembly 400 is configured to function as a turbine in the turbine configuration, such that the spool 440 may be driven to rotate by the rotor 410. Generally, the blower assembly 400 may be configured to drive rotation of the spool 440 to a rotational speed which is sufficient to enable the gas turbine engine to successfully execute an ignition process. Consequently, the blower assembly 400 dispenses with a need to provide a dedicated air turbine starting system or an electric starting system to the gas turbine engine, each of which are associated with additional weight and system complexity. Additionally or alternatively, the blower assembly 400 may be able to drive the spool 440 to rotate at a lower speed, for example to prevent the formation of a bowed engine rotor condition following engine shutdown or to reduce a bowed engine rotor condition prior to engine start. To this end, the start control and isolation valve 455 may be configured to control the mass flow and pressure of the air flow to a somewhat lower level than that required for engine starting.

The use of a two-configuration blower assembly 400 allows for an assembly in which the rotor 410 rotates in the same rotation direction (i.e., clockwise or anti-clockwise) in both the compressor configuration and the turbine configuration. In this way, in the turbine configuration of the blower assembly 400 the rotor 410 will drive the spool 440 to rotate in a direction that the spool 440 rotates when it drives the rotor 410 in the compressor configuration. This allows for the omission of a separate reversing mechanism to permit the spool 440 to be driven to rotate in its starting direction, which will be the same as the direction it rotates during when driving the rotor 410 in the compressor configuration. A separate reversing mechanism would result in additional mechanical efficiency losses in, and increased weight of and/or a reduced reliability of, the blower assembly 400.

FIG. 4 also schematically shows a gas turbine engine 10 comprising the first example blower assembly 400. The gas turbine engine 10 may be in accordance with the gas turbine engine 10 described above with respect to FIG. 1 and/or FIG. 2.

Various examples of a blower assembly in accordance with the blower assembly 400 described above with respect to FIG. 4 will now be described with reference to FIGS. 5A-6D, with like reference numerals being used to indicate common features.

Figure 5A:
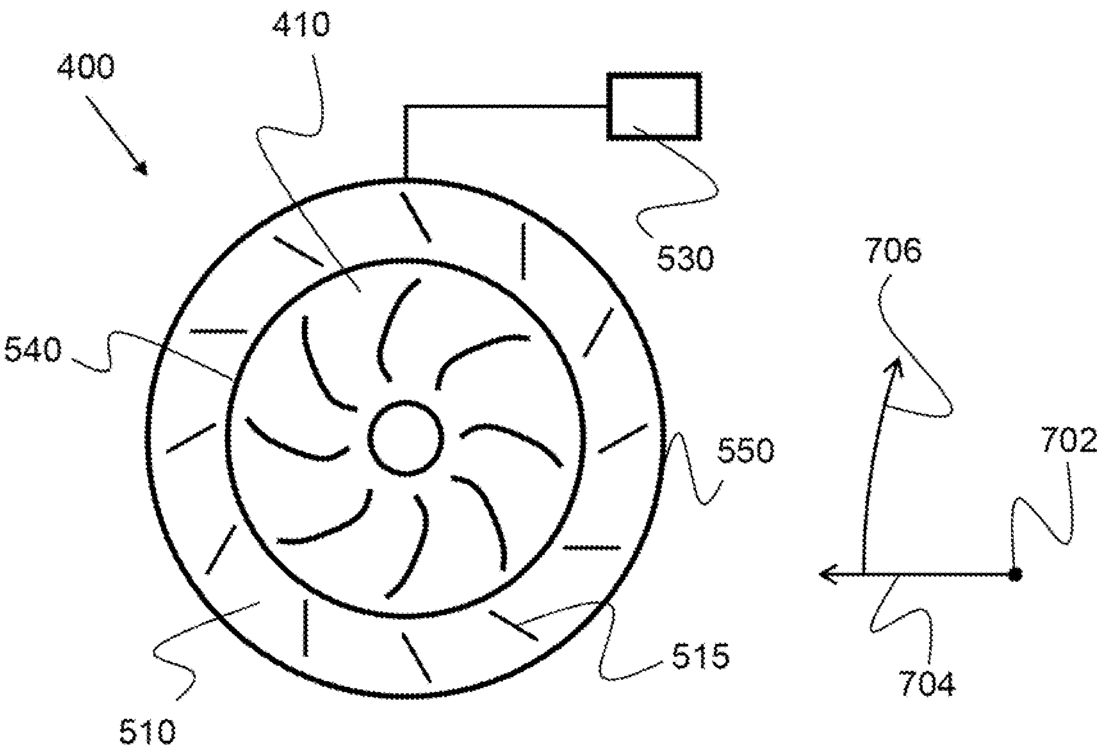
FIG. 5A schematically shows front view of the example blower assembly in a compressor configuration.
Figure 5B:
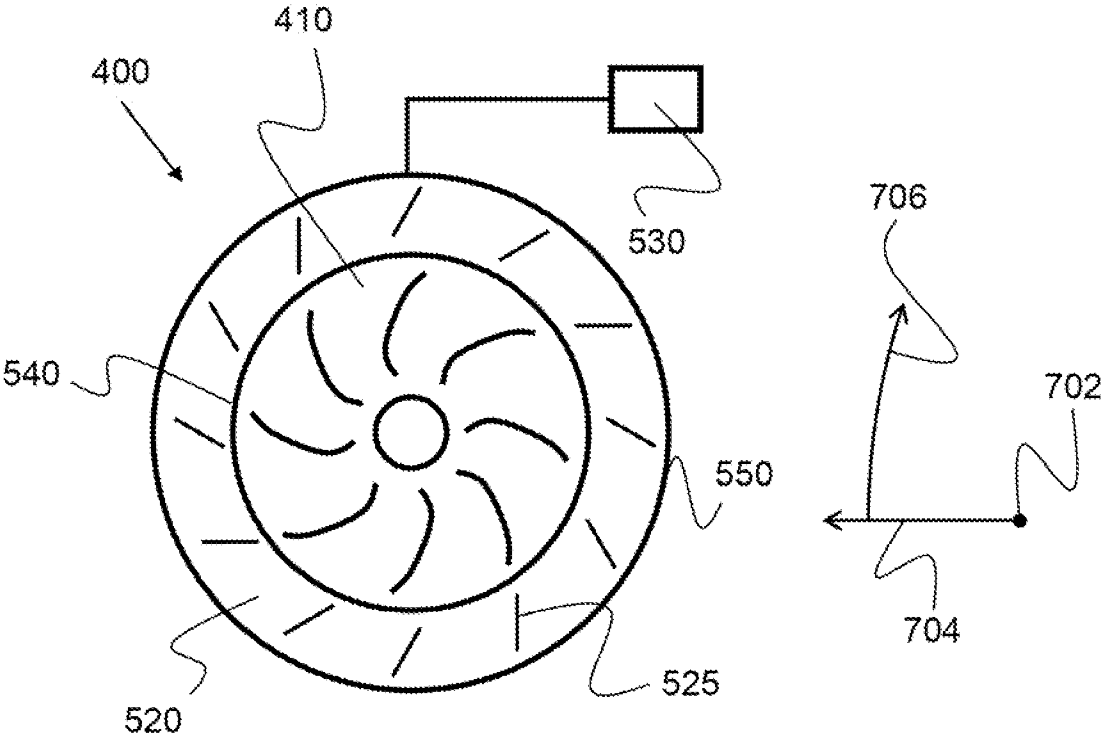
FIG. 5B schematically shows front view of the example blower assembly in a turbine configuration.

FIGS. 5A-5B show, schematically, a front or axial view of an example blower assembly 400 in a compressor configuration and in a turbine configuration, respectively. The blower assembly 400 comprises a rotor 410 configured to be mechanically coupled to a spool of a gas turbine engine. The blower assembly 400 may be referred to according to a cylindrical co-ordinate system having an axial direction 702, a radial direction 704 and a circumferential direction 706. The axial direction 702 is defined as being coaxial with a rotational axis of the rotor 410 while the circumferential direction 706 corresponds to a direction of rotation of the rotor 410 in use. The radial direction 704 is mutually locally perpendicular to both the axial direction 702 and the circumferential direction 706.

In the example of FIGS. 5A-5B, the flow modifier of the blower assembly 400 comprises a diffuser vane array 510 comprising a plurality of diffuser vanes 515, and a nozzle guide vane array 520 comprising a plurality of nozzle guide vanes 525.

In the compressor configuration, as shown in FIG. 5A, the diffuser vane array 510 is disposed around the rotor 410 and is configured to act together with the rotor 410 to compress air received at the rotor 410 by converting kinetic energy of air received from the rotor 410 into static pressure energy. Conversely, in the turbine configuration, as shown in FIG. 5B, the nozzle guide vane array 520 is disposed around the rotor 410 and is configured to act together with the rotor 410 to expand air received at the nozzle guide vane array 520 by converting static pressure energy of air received at the nozzle guide vane array 520 into kinetic energy and to guide the air at an optimised approach angle into the rotor 410.

A geometry of each of the plurality of diffuser vanes 515 of the array may be selected so as to optimise an aerodynamic performance of the diffuser vane array 510 without compromising an aerodynamic performance of the nozzle guide vane array 520. Likewise, a geometry of each of the plurality of nozzle guide vanes 525 may be selected so as to optimise an aerodynamic performance of the nozzle guide vane array 520 without compromising an aerodynamic performance (i.e., a turbine function) of the nozzle guide vane array 510. Accordingly, an overall performance of the blower assembly 400 in both the compressor configuration and the turbine configuration may be improved by providing dedicated flow modifiers for the respective modes of operation, rather than, for example, attempting to provide a single configuration through which the flow merely passes in different directions.

The geometries of each of the plurality of diffuser vanes 515 and of each of the plurality of nozzle guide vanes 525 is predetermined and fixed in use. It may be that angles of attack of each of the plurality of diffuser vanes 515 and of each of the plurality of nozzle guide vanes is predetermined and fixed in use. By providing a fixed configuration of the respective aerodynamic components, dynamic sealing losses associated with variable geometry and/or rotatable vanes may be eliminated or reduced, and the overall performance of the blower assembly 400 may be improved in the compressor configuration and/or the turbine configuration relative to alternative blower assemblies having such features.

The example blower assembly 400 further comprises an actuator arrangement 530 configured to cause relative movement between the rotor 410 and the diffuser vane array 510 so that the diffuser vane array 510 is disposed around the rotor 410 for operating in the compressor configuration. Similarly, the actuator arrangement 530 is also configured to cause relative movement between the rotor 410 and the nozzle guide vane array 520 so that the nozzle guide vane array 520 is disposed around the rotor 410 for operating in the turbine configuration.

The actuator arrangement 530 is further configured to adjust an effective axial height of the diffuser vanes 515, the effective axial height of the diffuser vanes 515 being defined with respect to a rotational axis of the rotor 410. Accordingly, in the compressor configuration, a compression performance of the blower assembly 400 may be adjusted to meet a compression demand associated with, for example, an airframe system.

To this end, an example actuator arrangement is described below with reference to FIGS. 6A-6D, with like reference numerals being used to indicate common features.

Figure 6A:
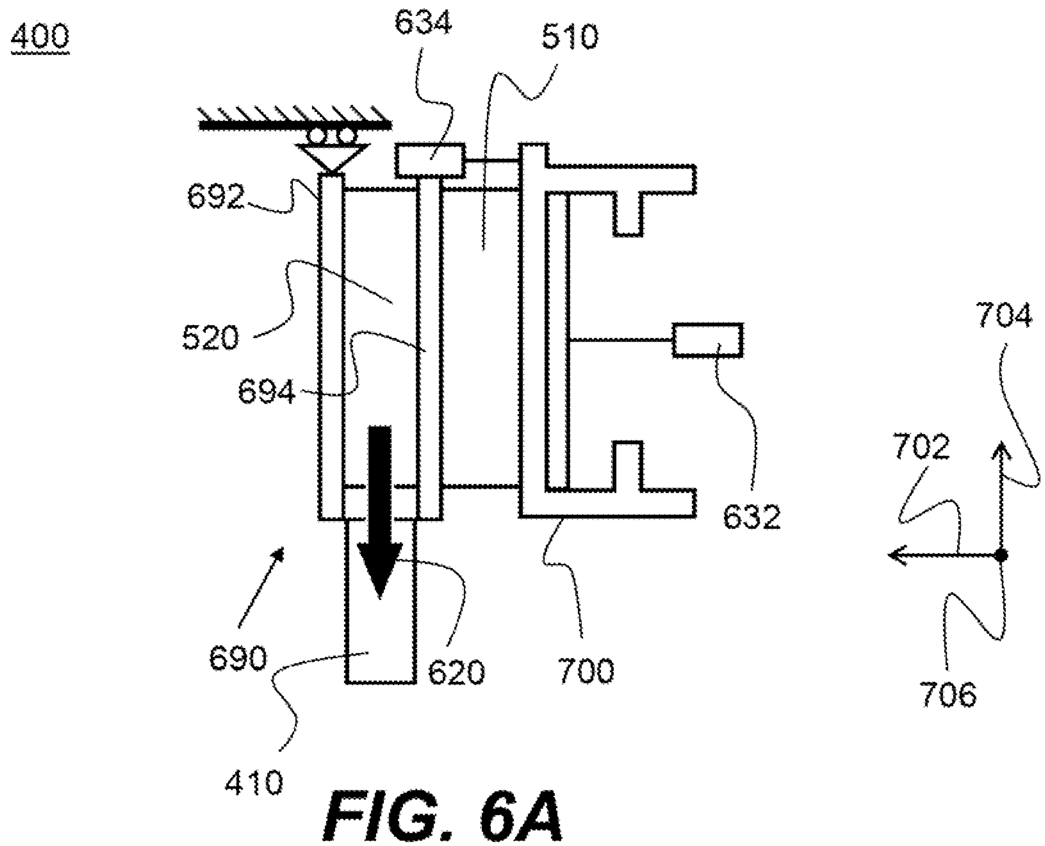
FIG. 6A schematically shows a view of the example blower assembly in a first configuration.

FIG. 6A shows a cross-sectional view of the blower assembly 400 in the turbine configuration in a radial plane intersecting and including the rotational axis of the blower assembly, corresponding to the configuration shown in the front (or axial) view shown in FIG. 5B. The view shows a cross-section at one angular location of the blower assembly (rather than two diametrically opposing locations either side of the rotational axis). In this example, the diffuser vane array 510 and the nozzle guide vane array 520 are rigidly connected so as to form a combined vane array assembly 690. The actuator arrangement comprises a mode actuator 632 (i.e., an actuator to move the blower assembly between the respective configurations for the respective different modes) and a diffuser height actuator 634. The mode actuator 632 is configured to cause relative movement between the rotor 410 and the combined vane array assembly 690 for moving the blower assembly 400 between the compressor configuration and the turbine configuration. In the turbine configuration, the nozzle guide vane array 520 is positioned (e.g., aligned along the rotational axis 702 of the blower assembly) with respect to the rotor 410 so as to allow air to flow through the nozzle guide vane array 520 and to the rotor 410 in a direction having a radially inward component (e.g., a compound tangential and radial direction), as indicated by the arrow 620. In this particular example, the combined vane array assembly 690 is configured to translate along an axial direction while the rotor 410 maintains a static axial position, such that the combined vane array assembly 690 may be referred to as a translating vane array assembly.

Figure 6B:
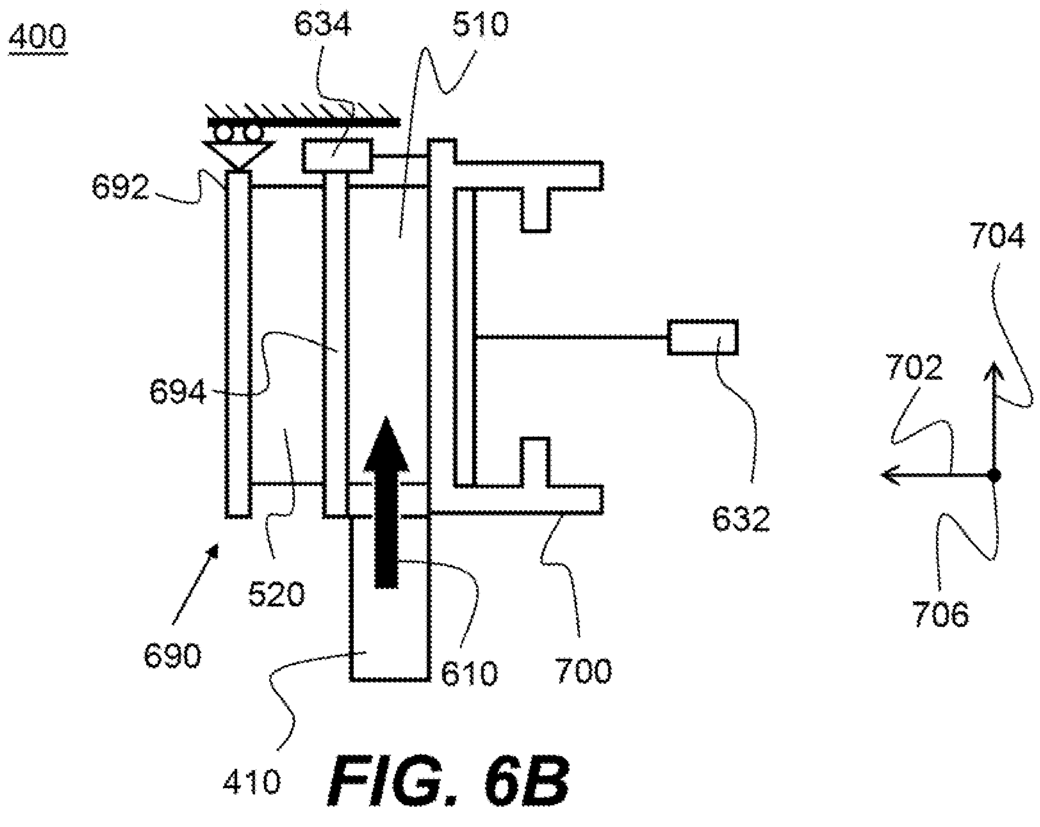
FIG. 6B schematically shows a view of the example blower assembly in a second configuration.

FIG. 6B shows a cross-sectional view of the blower assembly 400 in the compressor configuration, corresponding to the front/axial view shown in FIG. 5A. By comparison of FIGS. 6A and 6B, the function of the mode actuator 632 in moving the combined vane array assembly 690 relative to the rotor 410 can be seen. In the compressor configuration, the mode actuator 632 positions the diffuser vane array 510 with respect to the rotor 410 so as to allow air to flow from the rotor 410 and through the diffuser vane array 510 in a direction having a radially outward component (e.g., a compound tangential and radial direction), as indicated by the arrow 610.

The diffuser height actuator 634 of this example is configured to cause relative movement between the diffuser vane array 510 and a dynamic sealing assembly 700. A position of the dynamic sealing assembly 700 (e.g., an axial position) governs an effective axial height of the diffuser vanes 515 of the diffuser vane array 510. Specifically, the position of the dynamic sealing assembly 700 with respect to the diffuser vane array 510 governs a size of an open area of an inlet interface 540 between the rotor 410 and the diffuser vane array 510, and also governs the open area of the outlet at a radially outer side of the diffuser vane array 510. That is, the position of the dynamic sealing assembly 700 with respect to the diffuser vane array 510 governs a size of a cross sectional-area of the diffuser vane array 510 between the inlet interface 540 and the outlet interface 550 (best shown in FIG. 5A). Consequently, in the example of FIGS. 6A-6C, the diffuser height actuator 634 is configured to adjust the effective axial height (or axial extent) of the diffuser vanes 515 by varying the open area of the inlet interface 540 and varying an open area of an outlet 550.

Figure 6C:
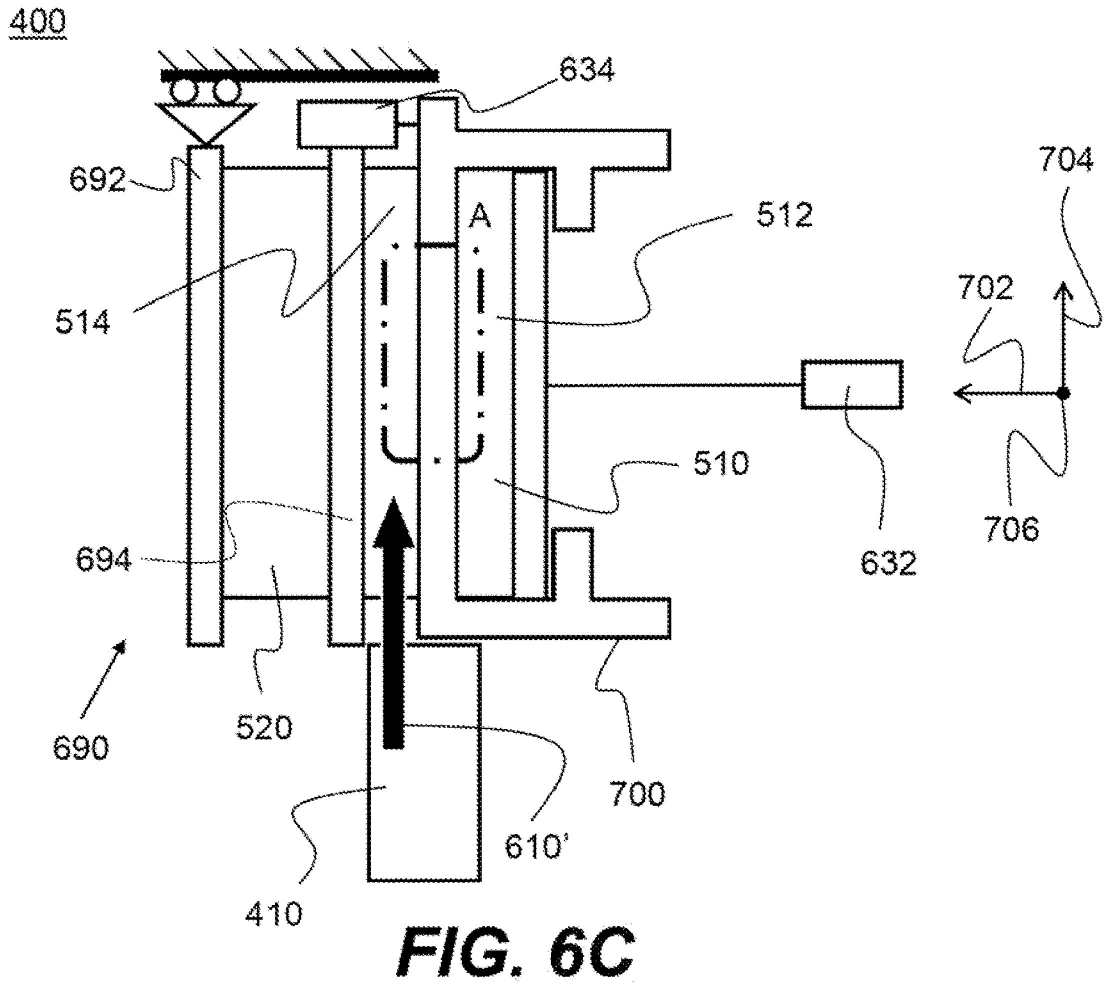
FIG. 6C schematically shows a view of the example blower assembly in a third configuration.

In FIGS. 6A and 6B, the dynamic sealing assembly 700 is in a retracted position in which the dynamic sealing assembly 700 is positioned so as not to reduce the effective axial height of the diffuser vanes 515 from a maximum, and thereby not to inhibit a flow of air from the rotor 410 through the diffuser vane array 510. FIG. 6C shows a cross-sectional view of the blower assembly 400 in the compressor configuration, corresponding to the front view shown in FIG. 5A. However, in FIG. 6C, the dynamic sealing assembly 700 is in an extended position. When the dynamic sealing assembly 700 is in the extended position, as shown in FIG. 6C, the flow of air 610' from the rotor 410 generally cannot pass through a closed region 512 of the diffuser vane array 510 but can pass through an open region 514 of the diffuser vane array 510. Therefore, the dynamic sealing assembly 700 is positioned so as to reduce the effective axial height of the diffuser vanes 515 and thereby inhibit a flow of air from the rotor 410 through the diffuser vane array 510 in the direction shown by the arrow 610'. In this way, the compression performance of the blower assembly 400 may be adjusted to meet a compression demand and/or a flow demand associated with, for example, an airframe system. The dynamic sealing assembly 700 is adapted to reduce air leakage around the diffuser vanes 515 from the open region 514 to the closed region 512 when the dynamic sealing assembly 700 is in the extended position while permitting relative movement between the dynamic sealing assembly 700 and the diffuser vane array 510 along the rotational axis 702.

By comparison of FIGS. 6B and 6C, the function of the diffuser height actuator 634 in moving the dynamic sealing assembly 700 relative to the diffuser vane array 510 can be seen. The provision of both the reconfiguration actuator 632 and the diffuser height actuator 634 allows the dynamic sealing assembly 700 to be moved between the retracted position and the extended position independently of whether the blower assembly 400 is in the compressor configuration or the turbine configuration.

This disclosure envisages that, in addition to or instead of governing of the effective axial height of the diffuser vanes 515, an effective axial height of the nozzle guide vanes 525 (defined with respect to the rotational axis of the rotor 410) may be similarly controlled using a nozzle guide height actuator configured to cause relative movement between the nozzle guide vane array 520 and a dynamic sealing assembly 700 as described herein, and thereby adjust a turbine performance of the blower assembly 400 in the turbine configuration.

Figure 7A:
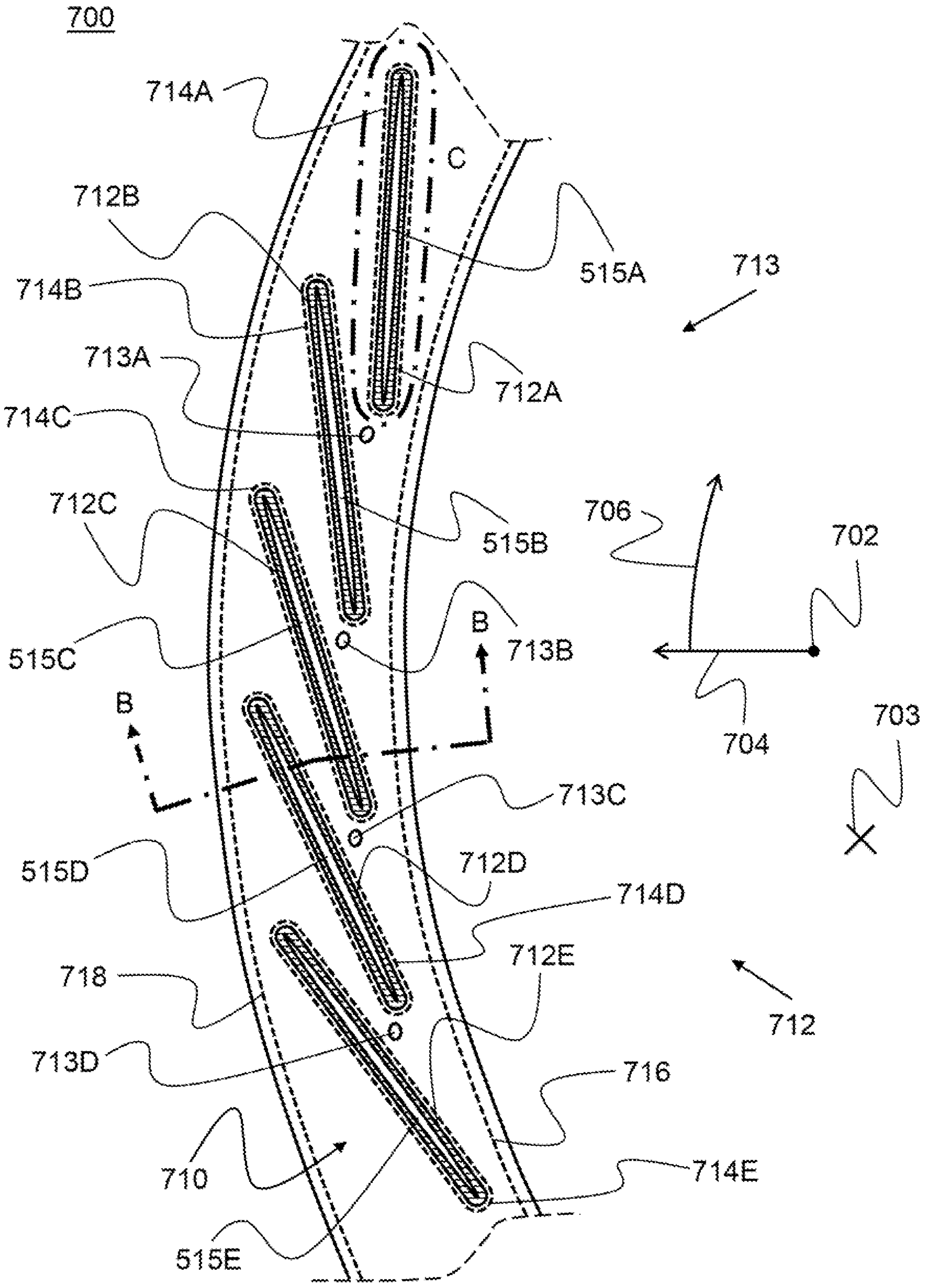
FIG. 7A shows a first view of a dynamic sealing assembly suitable for use within a rotary machine such as a blower assembly.
Figure 7B:
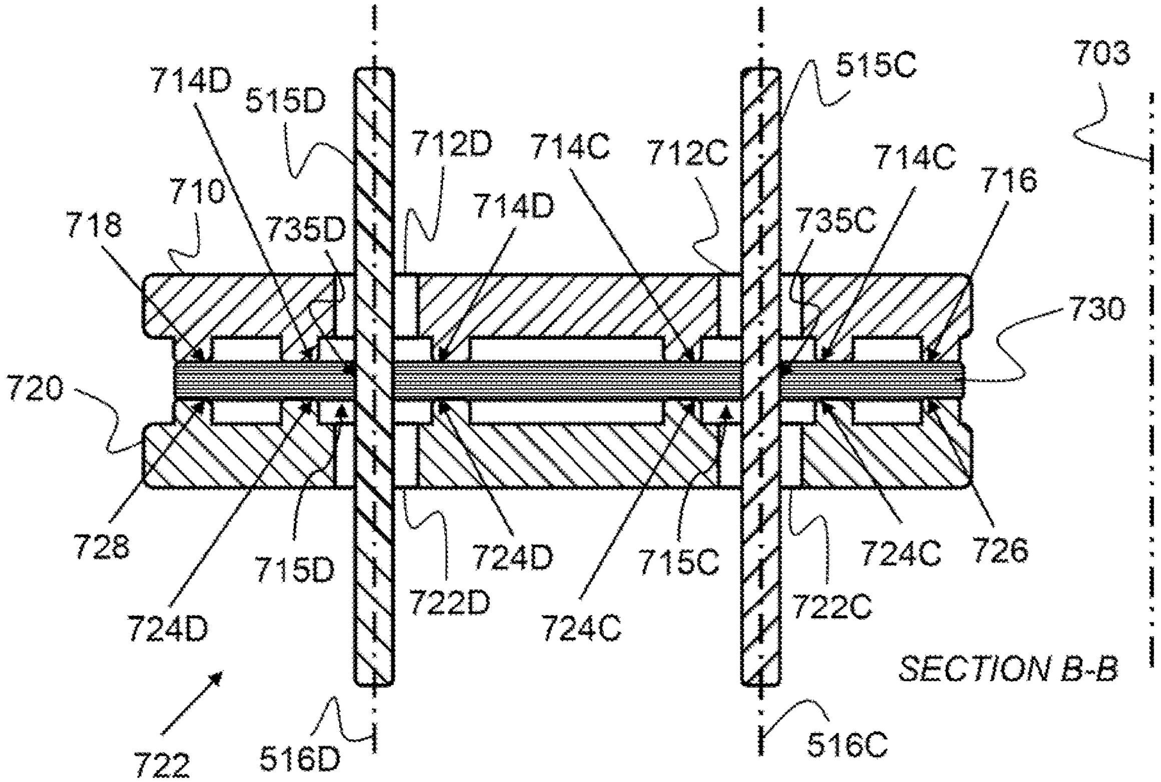
FIG. 7B shows a second view of a dynamic sealing assembly suitable for use within a rotary machine such as a blower assembly.
Figure 7C:
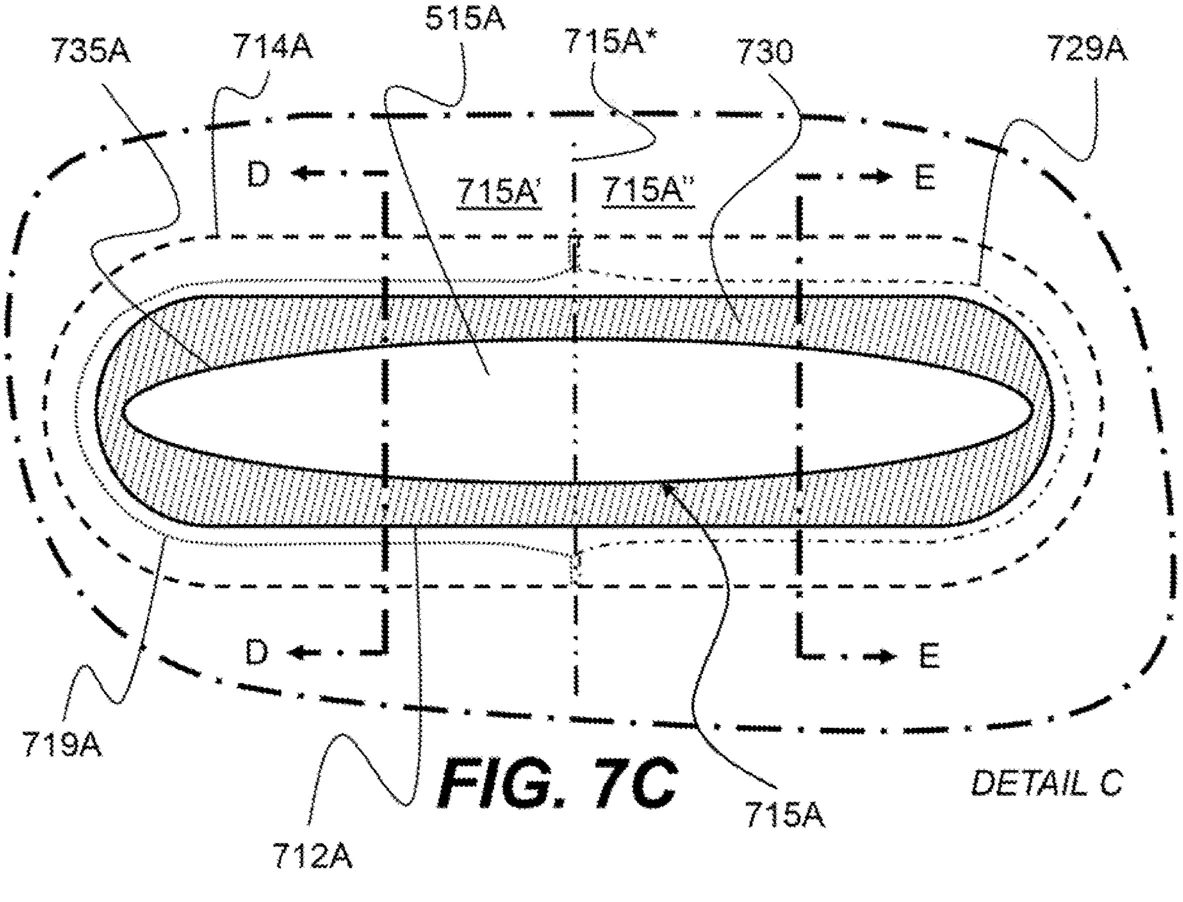
FIG. 7C shows a third view of a dynamic sealing assembly suitable for use within a rotary machine such as a blower assembly.

An example dynamic sealing assembly 700 is now described with reference to FIGS. 7A-7E. FIG. 7A shows a front or axial view of a representative sector of the dynamic sealing assembly 700 (the axial direction being the same as the axial direction as defined with respect to FIGS. 5A-5B). FIG. 7B shows a cross-sectional view of the dynamic sealing assembly 700 through section B-B as marked on FIG. 7A. FIG. 7C shows a detail view of the dynamic sealing assembly 700 at detail C as also marked on FIG. 7A.

The dynamic sealing assembly 700 comprises opposing sandwich plates, which are interchangeably referred to herein as a primary/upper plate and a secondary/lower plate. Features associated with each sandwich plate may also be referred to using the terms primary/upper and secondary/lower. The expressions upper and lower are used with reference to a longitudinal axis 703 along which the dynamic sealing assembly 700 is configured to be translated (e.g., moved), and it is to be appreciated that the plates are not to be interpreted as being at relatively higher or lower positions (e.g., with respect to a gravitational frame of reference). When incorporated within the blower assembly 400, the longitudinal axis 703 of the dynamic sealing assembly 700 is coincident with to the rotational axis 702 of the blower assembly 400 such that the dynamic sealing assembly 700 is coaxial with the rotor 410 of the blower assembly 400. The longitudinal axis 703 extends through a geometrical centre of the dynamic sealing assembly 700. If the dynamic sealing assembly 700 is annular, the dynamic sealing assembly 700 is therefore annular around the longitudinal axis 703.

The dynamic sealing assembly 700 comprises a primary (e.g., upper) sandwich plate 710 comprising a plurality of primary (e.g., upper) vane openings 712. In the example of FIG. 7A, a first upper vane opening 712A, a second upper vane opening 712B, a third upper vane opening 712C, a fourth upper vane opening 712D, and a fifth upper vane opening 712E are shown in the illustrated sector of the dynamic sealing assembly 700. However, it will be appreciated that the upper sandwich plate 710 may comprise any suitable number of upper vane openings 712.

As best shown by the cross-sectional view of FIG. 7B, the dynamic sealing assembly 700 comprises a bristle pack 730 disposed between (and clamped between) the upper sandwich plate 710 and a secondary (e.g., lower) sandwich plate 720. The bristle pack 730 comprises a plurality of bristles clamped between the sandwich plates 710, 720. Clamping of the bristle pack 730 between the sandwich plates allows simple and precise assembly of the dynamic sealing assembly 700 during a manufacturing process. In this example, each sandwich plate 710, 720 is substantially annular around the longitudinal axis 703. Accordingly, the example dynamic sealing assembly 700 is suitable for being disposed around a circular rotor, such as the rotor 410 described above with reference to FIGS. 5A-5B.

The lower sandwich plate 720 comprises a plurality of secondary (e.g., lower) vane openings 722. Each of the plurality of lower vane openings 722 corresponds to a respective upper vane opening 712. Therefore, the number of lower vane openings 722 is equal to the number of upper vane openings 712. Further, the plurality of upper vane openings 712 overlie the plurality of lower vane openings 722 with respect to the longitudinal axis 703, such that each upper vane opening overlies and is aligned with a corresponding lower vane opening to form a respective vane channel. As seen in the cross-sectional view of FIG. 7B, the third upper vane opening 712C overlies a third lower vane opening 722C to form a third vane channel 715C while the fourth upper vane opening 712D overlies a fourth lower vane opening 722D to form a fourth vane channel 715D. In a similar way, the first upper vane opening 712A overlies a first lower vane opening to form a first vane channel, the second upper vane opening 712B overlies a second lower vane opening to form a second vane channel and the fifth upper vane opening 712E overlies a fifth lower vane opening to form a fifth vane channel. In other words, each upper vane opening 712 overlies a respective lower vane opening 722 to form a vane channel between the upper sandwich plate 710 and the lower sandwich plate 720.

A plurality of windows are defined within (e.g., cut into) the bristle pack 730, with each window being defined within a respective vane channel so as to receive an aerodynamic body (e.g., a vane) therethrough along the longitudinal axis 703 of the dynamic sealing assembly 700. In the front view of FIG. 7A, each vane channel formed by the upper vane openings 712A-712E is shown as having received a respective vane 515A-515E therein. Each vane 515A-515E has a respective longitudinal axis 516A-516E parallel to the longitudinal axis 703 of the dynamic sealing assembly 700. In the cross-sectional view of FIG. 7B, the third vane channel 715C is shown with the third vane 515C having a longitudinal axis 516C extending through the third window 735C in the bristle pack 730 while the fourth vane channel 715D is shown with the fourth vane 515D having a longitudinal axis 516D extending through the fourth window 735D in the bristle pack 730. Definition of a window in each of the vane channels is associated with an improved sealing quality between the or each sandwich plate 710, 720 and the vane received within the vane channel and reduced friction therebetween.

When a dynamic sealing assembly 700 as described is incorporated within a blower assembly as described above with respect to FIGS. 5A-6D, the vanes 515A-515E are the diffuser vanes 510 of the diffuser vane array 515. In such implementations, the dynamic sealing assembly 700 is positioned within the blower assembly 400 such that each diffuser vane 510 extends through a respective vane channel, and the dynamic sealing assembly 700 is configured to axially slide over the respective vanes 510 along the longitudinal axis 703 while maintaining a seal therebetween. The dynamic sealing assembly 700 may otherwise be incorporated within a blower assembly so that the vanes 515A-515E are the nozzle guide vanes 520 of the nozzle guide vane array 525 and the dynamic sealing assembly 700 is similarly positioned within the blower assembly such that each nozzle guide vane 520 extends through within a respective vane channel.

The bristle pack 730 is generally configured to provide a brush seal between each vane received within the respective vane channels and the dynamic seal assembly (e.g., between each vane received within the respective vane channels and at least one of the sandwich plates 710, 720). The brush seal is formed by virtue of the bristles of the bristle pack 730 being proximal to, and preferably engaging (e.g., abutting contact), an outer surface of the vane 515A-515E. However, the deformable nature of the bristles of the bristle pack 730 allows limited-friction (e.g., low friction) relative movement between the dynamic sealing assembly 700 and the vanes 515A-515E received in each vane channel (through the window defined therein) along the longitudinal axis 703 of the dynamic sealing arrangement 700 vanes.

Compared to a previously considered dynamic sealing assembly, utilisation of the bristle pack 730 to provide a brush seal between the vanes 515A-515E and the dynamic sealing assembly 700 enables use of the dynamic sealing assembly 700 within a rotary machine (e.g., a turbomachine) having a higher expected maximum operational temperature. For example, in the context of the above-described blower assembly 400, the expected maximum operational temperature may be relatively high.

To aid the following description of the windows in the vane channels, an area immediately around the first upper vane opening 712A is shown in the detail front view of FIG. 7C. It should be appreciated that the following description applies, mutatis mutandis, to the areas around the other upper vane openings 712B-712E and therefore to each of the other vane channels and windows. The bristles of the bristle pack 730 may protrude into the first vane channel 715A formed by the alignment of the first upper vane opening 712A and the respective lower vane opening to define the first window 735A. The defined profile of the first window 735A corresponds to a cross-sectional profile of the vane 515A received therethrough. This enables both a good sealing performance of the bristle pack 730 with respect to the vane 515A and also low friction between the bristles of the bristle pack 730 and the vane 515A. More specifically, the defined profile of the first window 735A is smaller than the cross-sectional profile of the vane 515A, such that the bristles of the bristle pack 730 are deformed during an insertion of the vane 515A to form a brush seal between the vane 515A and the bristle pack 730.

Each window 735A, 735C, 735D may be formed within the bristle pack 730 using any suitable method of manufacture. Advantageously, each window 735A, 735C, 735D may be formed within the bristle pack 730 using water-jet cutting, laser cutting, or spark eroding. These techniques provide fast, effective and precise manufacturing of the dynamic sealing assembly 700. In particular, use of these methods may improve a sealing performance of the bristle pack 730 with respect to a vane received therethrough, as well as lower friction between the bristles of the bristle pack 730 and the vane during relative movement between the dynamic sealing assembly 700 and the vane in a direction parallel to the longitudinal axis of the vane in use.

Bristles of differing diameters may be used in varying quantities in the bristle pack 730 to reduce a void fraction of the bristle pack 730, the void fraction being defined as a fraction of the volume of the bristle pack 730 which is not occupied by bristle material. A reduced void fraction of the bristle pack 730 is associated with improved sealing performance of the bristle pack 730 with respect to the vane received through each window.

A respective upper vane opening boss 714A-714E is disposed around each upper vane opening 712A-712E on a side of the upper sandwich plate 710 proximal to the bristle pack 730. Although FIG. 7A shows a side (e.g., an outer side) of the upper sandwich plate 710 distal to the bristle pack 730 such that the upper vane opening bosses 714A-714E are not visible from this perspective, the position of the upper vane opening bosses 714A-714E are shown in dotted lines around each upper vane opening 712A-712E. Likewise, a respective lower vane opening boss is disposed around each lower vane opening on a side of the lower sandwich plate 720 proximal to the bristle pack 730. Each vane opening boss extends away from a surface of the respective sandwich plate 710, 720 and toward a vane opening boss disposed on the opposing sandwich plate 710, 720 to facilitate clamping of the bristles of the bristle pack 730 by means of cooperation therebetween.

FIG. 7B shows the bristle pack 730 as being clamped between the upper sandwich plate 710 and the lower sandwich plate 720 by: cooperation of the third vane opening bosses 714C and 724C, as well as cooperation of the fourth vane opening bosses 714D and 724D. More generally, the bristle pack 730 is clamped by cooperating vane opening bosses on opposing sandwich plates around each of the vane channels of the dynamic sealing assembly 700. Such an arrangement ensures that a position of the bristle pack 730 is reliably maintained, thereby providing a good brush seal between each of the vanes 515A-515E received within each vane channel and the sandwich plates 710, 720. In addition, as best seen in FIG. 7C, such an arrangement allows the bristles of the bristle pack 730 to locally deflect (e.g., with respect to a direction parallel to the radial direction 704) within a cant deflection plane normal to the rotational axis 702 and intersecting the bristle pack 730, to form a cant angle with respect to the vane 515A. The formation of the cant angle with respect to the vane 515A facilitates improved sealing of the bristle pack 730 with respect to the vane 515A as a consequence of a bristle blow-down effect explained below.

In the example dynamic sealing assembly 700 of FIGS. 7A-7E, an inner upper circumferential boss 716 is disposed proximal to a radially inner edge of the upper sandwich plate 710 on a side of the upper sandwich plate 710 proximal to the bristle pack 730, the position of which is shown as a dotted line on FIG. 7A. A respective lower circumferential boss 726 is disposed proximal to a radially inner edge of the lower sandwich plate 720 on a side of the lower sandwich plate 720 proximal to the bristle pack 730. Each circumferential boss extends away from a surface of the respective sandwich plate 710, 720 and toward a corresponding circumferential boss disposed on the opposing sandwich plate 710, 720 to facilitate clamping of the bristles of the bristle pack 730 by means of cooperation therebetween. In addition to the clamping arrangement discussed above, FIG. 7B shows the bristle pack 730 as being clamped between the upper sandwich plate 710 and the lower sandwich plate by: cooperation of the inner circumferential bosses 716 and 726 as well as cooperation of the outer circumferential bosses 718 and 728. To aid manufacture and assembly, each of the bristles of the bristle pack 730 may be laid out so as to extend from the inner circumferential bosses 716 and 726 to the outer circumferential bosses 718 and 728 along a direction substantially parallel to the radial direction 704 prior to being clamped between the upper sandwich plate 710 and the lower sandwich plate 720. Consequently, when clamped, each of the plurality of bristles of the bristle pack 730 extends substantially parallel to the radial direction 704. In other words, each of the plurality of bristles of the bristle pack 730 extends substantially parallel a local radial direction 704 extending from the longitudinal axis 703. It should be appreciated that the radial direction 704 is a local radial direction, and varies around the angular extent of the dynamic sealing assembly 700. Clamping the bristles of the bristle pack 730 by cooperation of the inner circumferential bosses 716 and 726 and/or cooperation of the outer circumferential bosses 718 and 728 holds the bristles of the bristle pack 730 in place in operation and thereby avoids excessive (and possibly resonant) vibration of the bristles of the bristle pack 730 in use, which may otherwise result in structural failure and/or detachment of the bristles of the bristle pack 730.

It may be that the expected maximum operational temperature of the dynamic sealing assembly 700 when incorporated within a rotary machine (e.g., the blower assembly 400) is equal to or greater than 300° C. Each of the plurality of bristles of the bristle pack 730 has a melting point which is greater than 300° C. Preferably, each of the plurality of bristles of the bristle pack 730 may have a melting point greater than 350° C. or greater than 400° C. To this end, each of the plurality of bristles of the bristle pack 730 may comprise a material having a melting point greater than 300° C., greater than 350° C., or greater than 400° C. Use of such a material for the bristles of the bristle pack ensures good general performance of the dynamic sealing assembly 700 throughout the expected operational temperature range of the dynamic sealing assembly 700 when incorporated within a blower assembly (as described herein) or a similar rotary machine. Preferably, each of the plurality of bristles may be formed of carbon fibre or a high-nickel alloy (e.g., an alloy containing no less than 25% Ni by weight), which may also provide optimal mechanical performance of the bristle pack in use and thereby increase a sealing quality between the or each sandwich plate 710, 720 and a vane received within the respective vane channel.

In addition, each of the plurality of bristles of the bristle pack 730 may be bonded to the upper sandwich plate 710 or to the lower sandwich plate 720. If so, the bristles are bonded to the sandwich plates at a plurality of bonding locations. Each bonding location may be between a pair of opposing vane opening bosses or, optionally, between a pair of opposing circumferential bosses. As best seen on FIG. 7B, the bristle pack 730 may be bonded to the sandwich plates 710, 720 at bonding locations between the third vane opening bosses 714C and 724C as well as the fourth vane opening bosses 714D and 724D. The bristle pack 730 may also be bonded to the sandwich plates 710, 720 at additional bonding locations between the inner circumferential bosses 716 and 726 as well as the outer circumferential bosses 718 and 728. Bonding between the bristle pack 730 and the sandwich plates 710, 720 in this way is associated with increased sealing quality between the respective sandwich plate 710, 720 and a vane received within the respective vane channel. The bristles of the bristle pack 730 may be bonded to the sandwich plates 710, 720 using any suitable method of manufacture. Preferably, the bristles of the bristle pack 730 are bonded to the upper sandwich plate 710 or the lower sandwich plate 720 using brazing, laser welding or diffusion bonding. This is associated with further increased sealing quality within the dynamic sealing assembly 700.

Referring now to FIG. 7C, the first vane channel 715A may be considered to have two regions: an inner region 715A' located relatively proximal to a geometrical centre of the dynamic sealing assembly 700; and an outer region 715A" located relatively distal to the geometrical centre of the dynamic sealing assembly 700. Two cross-sections through the first vane channel 715A are marked in FIG. 7C, one of which is located within the inner region 715' (through D-D) while the other is located within the outer region 715A" (through E-E). Although, like FIG. 7A, FIG. 7C shows a side of the upper sandwich plate 710 distal to the bristle pack 730 such that neither of the first vane opening bosses 714A and 724A are visible, the relative position of the upper vane opening boss 714A and the first lower vane opening boss 724A are shown in respective dotted lines around the first vane opening 712A. In FIG. 7C, the inner region 715A' and the outer region 715A" are shown as being separated by an illustrative dividing line 715*.

Figure 7E:
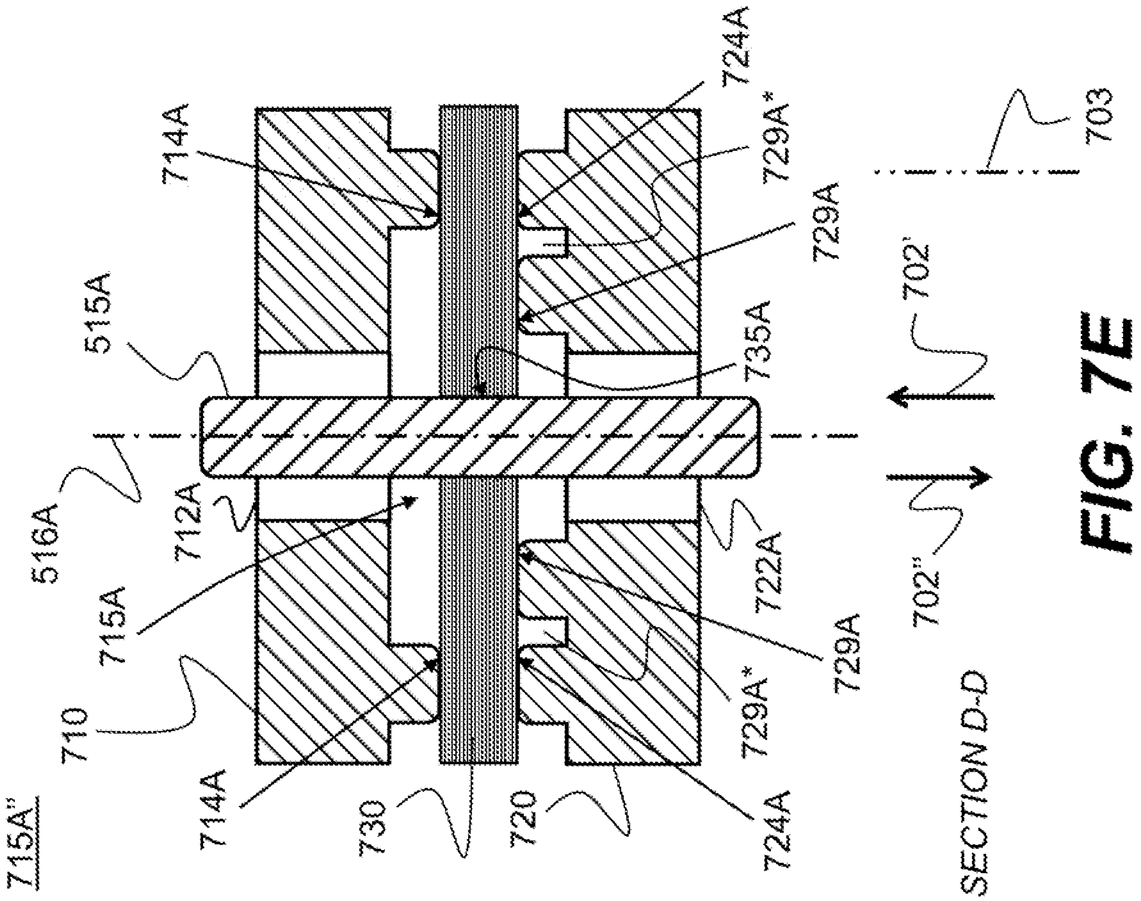
FIG. 7E shows a fifth view of a dynamic sealing assembly suitable for use within a rotary machine such as a blower assembly.
Figure 7D:
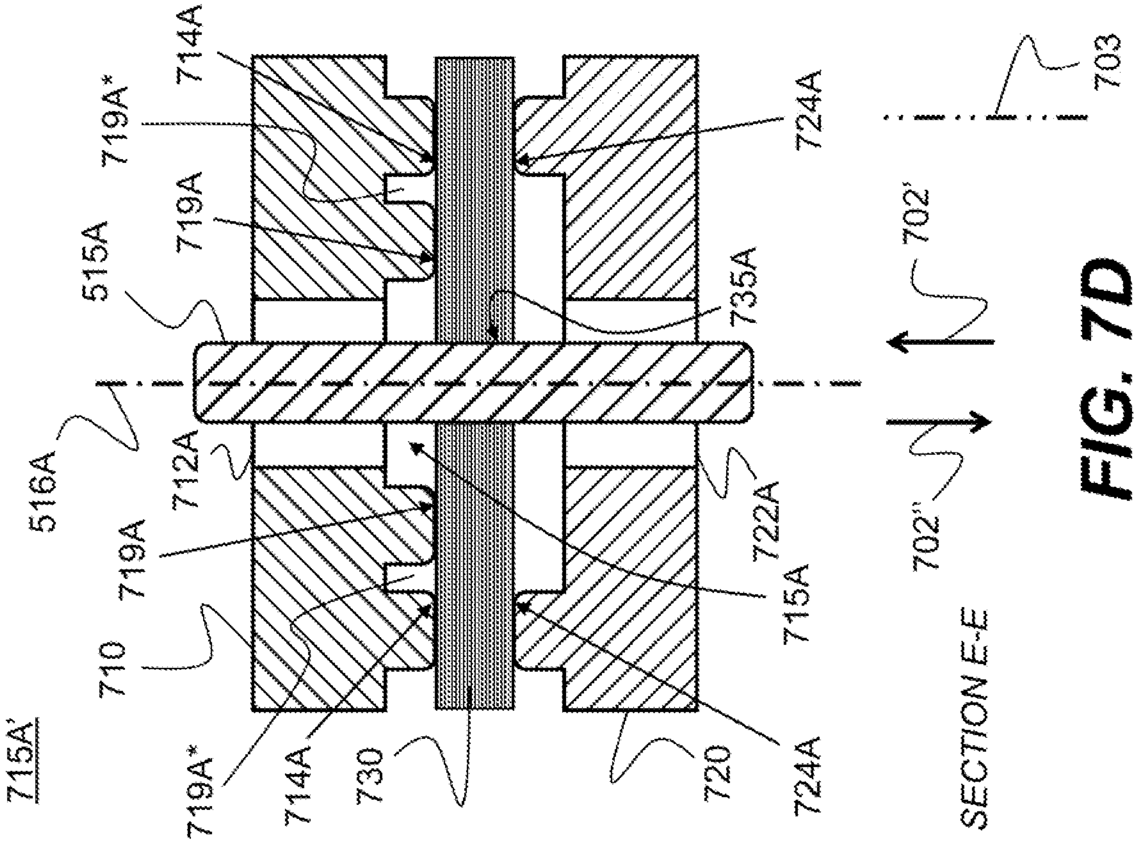
FIG. 7D shows a fourth view of a dynamic sealing assembly suitable for use within a rotary machine such as a blower assembly.

FIGS. 7D and 7E show views through sections D-D and E-E, respectively. Accordingly, FIG. 7D shows a cross-sectional view within the inner region 715A', whereas FIG. 7E shows a cross-sectional view within the outer region 715A". Both FIGS. 7D and 7E show a first lower vane opening 722A in addition to the first upper vane opening 712A. Also, in each of FIGS. 7D and 7E, two reference directions are defined. A first reference direction 702' is defined as extending parallel to the longitudinal axis 516A of the vane 515A from the lower sandwich plate 720 to the upper sandwich plate 710. A second reference direction 702" is defined as extending parallel to the longitudinal axis 703 of the dynamic sealing arrangement 700 (and therefore extending parallel to the longitudinal axis 516A of the vane 515A) from the upper sandwich plate 710 to the lower sandwich plate 720. Therefore, the first reference direction 702' opposes the second reference direction 702". In the example of FIGS. 7D and 7E, the longitudinal axis 516A of the vane 515A corresponds to a centreline 516A of the vane 515A.

When the vane 515A is received through the window 435A in the vane channel 715A, the bristles of the bristle pack 730 are configured to provide differing degrees of resistance to deflection in the first reference direction 702' and the second reference direction 702" in the inner region 715A' and the outer region 715A". Specifically, the bristles of the bristle pack 730 are configured to provide greater resistance to deflection in the first direction 702' within the inner region 715A' than within the outer region 715A". On the other hand, the bristles of the bristle pack 730 are configured to provide greater resistance to deflection in the second direction 702" within the outer region 715A" than within the inner region 715A'.

To this end, in each inner region 715A', an inner guide 719A is disposed between the primary opening boss 714A and the window 735A. The inner guide 719A protrudes from the primary sandwich plate 710 to meet and support the bristles of the bristle pack 730 at a location proximal to the window 735A and the vane 515A. The inner guide 719A allows the bristles of the bristle pack 730 to slide (e.g., translate) in the cant deflection plane while resisting movement (e.g., translation) of the bristles of the bristle pack 730 along the first direction 702' in a longitudinal plane. The longitudinal plane as defined herein is a plane in which the rotational axis 702 lies and which locally intersects the bristle pack. Therefore, the bristles of the bristle pack 730 may provide greater resistance to deflection in the first direction 702' compared to deflection in the second direction 702" within the inner region 715A'.

Similarly, in each outer region 715A", an outer guide 729A is disposed between the secondary opening boss 724A and the window 735A. The outer guide 729A protrudes from the secondary sandwich plate 720 to meet and support the bristles of the bristle pack 730 at a location proximal to the window 735A and the vane 515A. The outer guide 729A allows the bristles of the bristle pack 730 to slide (e.g., translate) in the cant deflection plane while resisting movement (e.g., translation) of the bristles of the bristle pack 730 along the second direction 702" in the longitudinal plane within the outer region 715A". Therefore, the bristles of the bristle pack 730 may provide greater resistance to deflection in the second direction 702" compared to deflection in the first direction 702' within the outer region 715A". Without wishing to be bound by theory, those skilled in the art will understand that according to classical beam theory, this arrangement ensures that a force required to cause a specified flexural deflection of the bristles of the bristle pack 730 in the first direction is higher within the inner region 715A' than within the outer region 715A". On the other hand, a force required to cause a specified flexural deflection of the bristles in the second direction is higher within the outer region 715A" than within the inner region 715A'.

The inner guide 719A is separated from the primary opening boss 714A by an inner intervening space 719A*. The inner guide 719A meets the primary opening boss 714A at a location proximal to the outer region 715A" (shown as being proximal to the illustrative dividing line 715* in FIG. 7C) to seal the inner intervening space 719A* such that high pressure air from the outer region 715A" is inhibited from entering and subsequently leaking from the inner intervening space 719A* in use. Likewise, the outer guide 729* is separated from the secondary opening boss 724A an outer intervening space 729A*. The outer guide 729A meets the secondary opening boss 724A at a location proximal to the inner region 715A' (shown as being proximal to the illustrative dividing line 715* in FIG. 7C) to seal the outer intervening space 729A* such that high pressure air from the inner region 715A' is inhibited from entering and subsequently leaking from the outer intervening space 729A* in use. Separating each guide 719A, 729A from the respective opening boss 714A, 724A by the intervening spaces 719A*, 729A* reduces a friction between the bristles of the bristle pack 730 and the respective sandwich plate 710, 720. Accordingly, the bristles of the bristle pack 730 may more easily form a cant angle with respect to the vane 515A within each region 715A', 715A" during a manufacturing process. In addition, the bristles of the bristle pack 730 may more easily deflect according to the bristle blow-down effect discussed below.

Figure 6D:
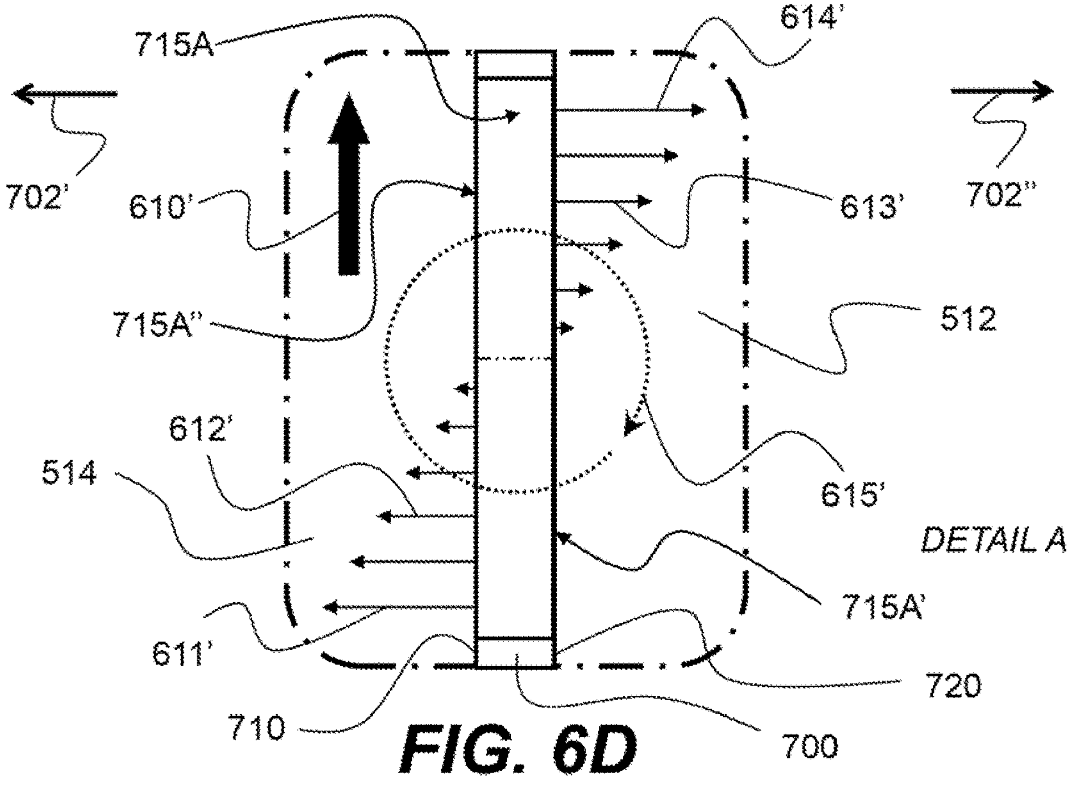
FIG. 6D schematically shows a view of the example blower assembly in a fourth configuration.

Some benefits of these features are now explained in the context of the blower assembly 400 with reference to FIG. 6D, which shows a detail cross-sectional view of the blower assembly 400 in the compressor configuration at detail A as marked on FIG. 6C. The detail cross-sectional view also shows an annotated cross-sectional view of the first vane channel 715A within the dynamic sealing assembly 700. However, it should be appreciated that the following description may be applied, mutatis mutandis, to each of the vane channels of the dynamic sealing assembly. The first vane channel 715A may be considered to have two regions: an inner region 715A' located relatively proximal to a geometrical centre of the rotor 410 and the dynamic sealing assembly 700; and an outer region 715A" located relatively distal to the geometrical centre of the rotor 410 and the dynamic sealing assembly 700.

As discussed above, the diffuser vanes 515 of the diffuser vane array 510 are configured to act together with the rotor 410 to compress air received at the rotor 410 by converting kinetic energy of air received from the rotor 410 into static pressure energy. Therefore, when the blower assembly 400 is operating as a compressor, the static pressure of air within the open region 514 adjacent to the inner region 715A' (proximal to the geometrical centre of the rotor 410) is significantly lower than the static pressure of air within the open region 514 adjacent to the outer region 715A" (distal to the geometrical centre of the rotor 410). In particular, it may be that the static pressure of air within the open region 514 adjacent to the inner region 715A' is lower than the static pressure of ambient air within the closed region 512 adjacent to the inner region 715A' and the static pressure of air within the open region 514 adjacent to the outer region 715A" is greater than the static pressure of ambient air within the closed region 512 adjacent to the outer region 715A".

As a result of these differences in static pressure, air leakage may occur between the open region 514 of the diffuser vane array 510 and the closed region 512 of the diffuser vane array 510 across the first vane channel 715A of the dynamic sealing assembly 700. The magnitude and direction of air leakage across the first vane channel 715A is indicated by the plurality of arrows 611'-614' on FIG. 6D. In the inner region 715A', the driving static pressure difference is such that the direction of air leakage is generally from the closed region 512 to the open region 514. Conversely, in the outer region 715A", the driving static pressure difference is such that the direction of air leakage is generally from the open region 514 to the closed region 514. As a result, recirculation of air between the open region 514 and the closed region 512 may arise. The arrow 615' on FIG. 6D indicates the general direction of recirculating airflow. The degree of recirculating airflow is directly related to a sealing performance of the dynamic sealing assembly 700. A poor sealing performance of the dynamic sealing assembly leads to a high degree of recirculating airflow, which in turn reduces an efficiency of the blower assembly 400.

By configuring the bristles of the bristle pack 730 to provide greater resistance to deflection in the first direction 702' within the inner region 715A', the static driving pressure difference within the inner region 715A' may be better resisted by the bristles of the bristle pack 730. Likewise, by configuring the bristles of the bristle pack 730 to provide greater resistance to deflection in the second direction 702" within the outer region 715A", the static driving pressure difference within the inner region 715A' may be better resisted by the bristles of the bristle pack 730.

In use, the static pressure differential between the open 514 and closed 512 regions causes air having a relatively high static pressure to flow into the inner intervening space 719A* and into the outer intervening space 729A* from the region having the relatively higher static pressure (compare FIG. 6D with FIGS. 7D and 7E). The high static pressure of the air in these spaces causes air to subsequently flow over the respective guides 719, 729 and toward the region having the relatively lower static pressure (that is, substantially in the cant deflection plane). Air flowing over the respective guides causes the bristles of the bristle pack 730 to be forced against and deflected with respect to the outer surface of vane 515A as a result of the cant angle which has formed with respect to the vane 515A in the cant deflection plane. Such deflection of the bristles of the bristle pack 730 may be referred to as a bristle blow-down effect. The bristle blow-down effect increases a friction between the bristles of the bristle pack 730 and the outer surface of the vane 515A due to the force acting on the bristles and thereby increases a sealing quality provided by the bristles of the bristle pack 730 which in turn reduces a rate of air leakage between the open region 514 and the closed region 512 of the diffuser vane array 510.

Accordingly, the features described above with respect to FIGS. 7C-7E are associated with reduced air leakage across the dynamic sealing assembly 700. In the context of the blower assembly 400, this effect is linked to a reduction in recirculating airflow and therefore improved efficiency of the blower assembly 400.

FIG. 7A also shows the upper sandwich plate 710 as comprising a plurality of upper throat openings 713. In this example, a first throat opening 713A, a second throat opening 713B, a third throat opening 713C, and a fourth throat opening 713D are shown in the illustrated sector of the dynamic sealing assembly 700. However, it will be appreciated that the upper sandwich plate 710 may comprise any suitable number of throat openings 713. Each of the throat openings are located proximal to at least one of the plurality of upper vane openings 712. For instance, the first throat opening 713A is located proximal to and between the first upper vane opening 712A (and therefore the first vane 515A) as well as the second upper vane opening 712B (and therefore the second vane 515B). Further, each of the throat openings 713 are in fluid communication with each other throat opening via a connecting fluid pathway (not shown). The connecting fluid pathway may be, for instance, a fixed-internal volume defined within the upper sandwich plate 710.

When incorporated within a rotary machine (such as the blower assembly 400 described above with reference to FIGS. 6A-6D), it may be that pressure differences between locations on one of the sandwich plates 710, 720 tend to develop as a result of non-uniformities in thermofluidic properties of gaseous fluid (e.g., air) passing over the respective sandwich plate 710, 720. In the example of FIG.

6D, the first sandwich plate 710 faces the open region 514 of the diffuser vane array 510 while the second sandwich plate faces the closed region 512 of the diffuser vane array 510. The largest pressure differences are likely to develop on the first sandwich plate 710 between locations proximal to and between respective vanes 515A-515E received in the vane channels of the dynamic sealing assembly 700 as a result of non-uniformities compression or expansion of air in the open region 514 of the diffuser vane array 510 as a result of the cooperation of the rotor 410 and the diffuser vane array 510. Any such pressure differences are associated with reduced efficiency and performance of a rotary machine in which the dynamic sealing assembly 700 is incorporated.

The provision of the plurality of throat openings 713A-713D together with the connecting fluid pathway allows a degree of pressure equalisation between the locations of the throat openings 713A-713D. The locations of each of the throat openings 713A-713D correspond to the locations at which the largest pressure differences are likely to develop, as described above. Therefore, the throat openings 713A-713D and the connecting fluid pathway provide pressure equalisation functionality to the dynamic sealing assembly 700, which is associated with an increased efficiency and performance of a rotary machine in which the dynamic sealing assembly 700 is positioned. In some examples, the connecting fluid pathway may be a fixed volume which is wholly disposed within the upper sandwich plate 710 such that the connecting fluid pathway is internal to the upper sandwich plate 710. In other examples, the connecting fluid pathway may be partially disposed within the upper sandwich plate 710 and partially disposed outside of the upper sandwich plate 710.

To facilitate pressure equalisation functionality provided to the dynamic sealing assembly 700 by the cooperation of the throat openings 713A-713D and the connecting fluid pathway, a hole may be formed in the bristle pack 730 at a location underlying each throat opening 713A-713D. Preferably, each hole may be formed within the bristle pack 730 so as to be substantially flush with an edge of the corresponding throat opening 713A-713D to provide improved pressure equalisation function to the dynamic sealing assembly 700. Each hole may be formed within the bristle pack 730 using any suitable method of manufacture. Advantageously, each hole may be formed within the bristle pack 730 using water-jet cutting, laser cutting, or spark eroding to enable fast, effective and precise manufacturing of the dynamic sealing assembly 700.

Although the dynamic sealing assembly 700 has been described in the context of a blower assembly 400 which is operable in both a compressor configuration and a turbine configuration, this need not necessarily be the case. For instance, the dynamic sealing assembly 700 is suitable for use in a blower assembly which is only operable in the compressor configuration or a turbine configuration, and in which the actuator arrangement is not configured to cause relative movement between the rotor and the diffuser vane array for operating in the compressor configuration or to cause relative movement between the rotor and the nozzle guide vane array for operating in the turbine configuration. In other words, the dynamic sealing assembly 700 is suitable for use in the blower assembly which is not operable in a turbine configuration and which does not comprise a nozzle guide vane array. In such a blower assembly, the actuator arrangement may only be configured to cause relative movement between the dynamic sealing assembly and a diffuser vane array to adjust an effective axial height of a plurality of diffuser vanes of the diffuser vane array in a compressor configuration. Similarly, the dynamic sealing assembly 700 is suitable for use in a blower assembly which is not operable in a compressor configuration and which does not comprise a diffuser vane array. If so, the actuator assembly may only be configured to cause relative movement between the dynamic sealing assembly and a nozzle guide vane array to adjust an effective axial height of a plurality of nozzle guide vanes of the nozzle guide vane array in a turbine configuration.

More generally, it will be appreciated that the dynamic sealing assembly 700 may be used in the context of other types of rotary machines (e.g., centrifugal compressors, centrifugal turbines, axial compressors, axial turbines and the like). In particular, the dynamic sealing assembly 700 may be in a non-annular (e.g., non-round) form. In addition, although it has been described that the bristle pack 730 is clamped between the upper sandwich plate 710 and the lower sandwich plate 720 such that the sandwich plates have substantially parallel and substantially flat outer surfaces, this need not be the case. For example, the outer surfaces of the sandwich plates may not be parallel and/or the outer surfaces of the sandwich plates may have different forms. To give an example, both of the sandwich plates 710, 720 may instead have a conical outer surface. To give a further example, the upper sandwich plate 710 may have a flat outer surface, whereas the lower sandwich plate 720 have a conical outer surface. The dynamic sealing assembly 700 is broadly suitable for use in a variety of technical areas, including aerospace applications, marine applications, automotive applications and the like.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A dynamic sealing assembly for a rotary machine, comprising:

a primary sandwich plate comprising a plurality of primary vane openings;

a secondary sandwich plate comprising a plurality of secondary vane openings; and a bristle pack comprising a plurality of bristles disposed between the primary sandwich plate and the secondary sandwich plate;

wherein each of the plurality of primary vane openings overlies and aligns with a respective secondary vane opening to form a vane channel for receiving a vane along a longitudinal axis of the dynamic sealing assembly; and wherein the bristle pack is configured to:

provide a brush seal between each vane received within the respective vane channels and the dynamic sealing assembly; and allow relative movement between the dynamic sealing assembly and the vane received within each vane channel along the longitudinal axis.

2. The dynamic sealing assembly of claim 1, wherein in each of the vane channels, a window is defined within the bristle pack to receive the vane therethrough.

3. The dynamic sealing assembly of claim 2, wherein each window is defined within the bristle pack such that the bristle pack protrudes into the respective vane channel to define the window.

4. The dynamic sealing assembly of claim 2, wherein a profile of each of the windows corresponds to a cross-sectional profile of the vane to be received therein.

5. The dynamic sealing assembly of claim 1, wherein the bristle pack is clamped between the primary sandwich plate and the secondary sandwich plate.

6. The dynamic sealing assembly of claim 5, wherein the bristle pack is clamped by cooperation of a primary opening boss disposed around each of the primary vane openings and an opposing secondary vane opening boss disposed around the respective secondary vane opening.

7. The dynamic sealing assembly of claim 6, wherein each of the plurality of bristles of the bristle pack is bonded to the primary sandwich plate and/or to the secondary sandwich plate at a plurality of bonding locations, each bonding location being between a respective primary opening boss and an opposing secondary vane opening boss.

8. The dynamic sealing assembly of claim 1,
- wherein each vane channel has:
  - an inner region located relatively proximal to a geometrical centre of the dynamic sealing assembly; and
  - an outer region located relatively distal to the geometrical centre of the dynamic sealing assembly,
- wherein the dynamic sealing arrangement is configured such that:
  - the bristles of the bristle pack provide greater resistance to deflection in a first direction parallel to the longitudinal axis within the inner region than within the outer region; and
  - the bristles of the bristle pack provide greater resistance to deflection in a second direction parallel to the longitudinal axis within the outer region than within the inner region, the first direction opposing the second direction.

9. The dynamic sealing assembly of claim 1,
- wherein each window is defined within the bristle pack such that the bristle pack protrudes into the respective vane channel to define the window,
- wherein the bristle pack is clamped by cooperation of a primary opening boss disposed around each of the primary vane openings and an opposing secondary vane opening boss disposed around the respective secondary vane opening,
- wherein each vane channel has:
  - an inner region located relatively proximal to a geometrical centre of the dynamic sealing assembly; and
  - an outer region located relatively distal to the geometrical centre of the dynamic sealing assembly, and
- wherein, in each inner region, an inner guide is disposed between the primary opening boss and the window, the inner guide protruding from the primary sandwich plate to support the bristles of the bristle pack.

10. The dynamic sealing arrangement of claim 9, wherein in each outer region, an outer guide is disposed between the secondary opening boss and the window, the outer guide protruding from the secondary sandwich plate to support the bristles of the bristle pack.

11. The dynamic sealing assembly of claim 1, wherein:
- the primary sandwich plate comprises a plurality of throat openings; and
- each throat opening is in fluid communication with each other throat opening via a connecting fluid pathway.

12. The dynamic sealing assembly of claim 11, wherein each throat opening is located proximal to a respective vane channel.

13. The dynamic sealing assembly of claim 11, wherein a hole is formed in the bristle pack at a location underlying each throat opening.

14. The dynamic sealing assembly of claim 13, wherein each hole is formed in the bristle pack such that an edge of the respective hole is substantially flush with an edge of the respective throat opening.

15. The dynamic sealing assembly of claim 1, wherein:
- each sandwich plate is annular around the longitudinal axis; and
- each of the plurality of bristles of the bristle pack extends substantially parallel a local radial direction extending from the longitudinal axis.

16. The dynamic sealing assembly of claim 1, wherein each of the plurality of bristles of the bristle pack has a melting point which is greater than 300° C.

17. A blower assembly for providing air to an airframe system, the blower assembly comprising:
- the dynamic sealing assembly of claim 1; and
- a rotor configured to be mechanically coupled to a spool of a gas turbine engine;
- wherein the blower assembly is operable in a compressor configuration in which the rotor is configured to be driven to rotate by the spool and to receive and compress air from the gas turbine engine, and discharge the compressed air for supply to the airframe system; and
- wherein the blower assembly further comprises:
  - a diffuser vane array comprising a plurality of diffuser vanes and configured to act together with the rotor to compress air received at the rotor in the compressor configuration, wherein the dynamic sealing assembly is positioned within the blower assembly such that each diffuser vane is partially located within a respective vane channel; and
  - an actuator arrangement configured to cause relative movement between the dynamic sealing assembly and the diffuser vane array to adjust an effective axial height of the diffuser vanes in the compressor configuration, wherein the effective axial height is with respect to a rotational axis of the rotor.

18. A blower assembly for providing air to an airframe system, the blower assembly comprising:
- the dynamic sealing assembly of claim 1; and
- a rotor configured to be mechanically coupled to a spool of a gas turbine engine;
- wherein the blower assembly is operable in a turbine configuration in which the rotor is configured to receive air from an external air source to drive the spool to rotate; and
- wherein the blower assembly further comprises:
  - a nozzle guide vane array comprising a plurality of nozzle guide vanes and configured to act together with the rotor to expand air received at the nozzle guide vane array in the turbine configuration, wherein the dynamic sealing assembly is positioned within the blower assembly such that each nozzle guide vanes is partially located within a respective vane channel; and
  - an actuator arrangement configured to cause relative movement between the dynamic sealing assembly and the nozzle guide vane array to adjust an effective axial height of the nozzle guide vanes in the turbine configuration, wherein the effective axial height is with respect to a rotational axis of the rotor.

19. A gas turbine engine comprising the blower assembly of claim 17.

20. A gas turbine engine comprising the blower assembly of claim 18.

* * * * *